United States Patent [19]

Marin et al.

[11] 4,018,871
[45] Apr. 19, 1977

[54] DISMUTATION OF TRICHLOROSILANE

[75] Inventors: Gilbert Marin, Sante-Foy-Les-Lyon; Marcel Lefort, Caluire, both of France

[73] Assignee: Rhone-Poulenc Industries, Paris, France

[22] Filed: Nov. 4, 1975

[21] Appl. No.: 628,667

[30] Foreign Application Priority Data

Nov. 7, 1974 France .............................. 74.36960

[52] U.S. Cl. ............................. 423/342; 252/426
[51] Int. Cl.² ........................................ C01B 33/08
[58] Field of Search .................... 423/342; 252/426

[56] References Cited
UNITED STATES PATENTS

| | | |
|---|---|---|
| 2,627,451 | 2/1953 | Erickson et al. .................. 423/342 |
| 2,732,281 | 1/1956 | Bailey et al. ........................ 423/342 |
| 2,732,282 | 1/1956 | Bailey et al. ........................ 423/342 |
| 2,834,648 | 5/1958 | Bailey et al. ........................ 423/342 |
| 3,044,845 | 7/1962 | Jex et al. ............................ 423/342 |
| 3,322,511 | 5/1967 | Weyenberg ........................ 423/342 |
| 3,445,200 | 5/1969 | Dunogues ...................... 423/342 X |
| 3,535,092 | 10/1970 | Chalk ................................. 423/342 |
| 3,627,501 | 12/1971 | Kruger .............................. 423/342 |

Primary Examiner—Jack Cooper
Attorney, Agent, or Firm—Stevens, Davis, Miller & Mosher

[57] ABSTRACT

Trichlorosilane is dismutated into dichlorosilane in the presence of an α-pyrrolidone which is N-substituted by a hydrocarbon radical as catalyst.

5 Claims, No Drawings

DISMUTATION OF TRICHLOROSILANE

The present invention relates to a process for the dismutation of trichlorosilane.

It is known that the dismutation of trichlorosilane gives dichlorosilane and it is also known that dichlorosilane is used for the preparation of silicon coatings of very high purity in the electronics industry (epitaxy of silicon). With this object in mind, the dismutation reaction has been carried out in the presence of various catalysts. Amongst the various catalysts it has been proposed to use nitriles (see U.S. Pat. No. 2,732,282). The disadvantage of this process resides in the need to carry out the dismutation reaction at a temperature of the order of 150° C and above. The aliphatic cyanamides can also be used as dismutation catalysts (see U.S. Pat. No. 2,732,280) but in order to activate these catalysts it is necessary to subject them to a supplementary treatment with a Lewis acid (see U.S. Pat. No. 2,732,281). It follows that the resulting dichlorosilane contains impurities such as boron, aluminium and titanium and is therefore unsuitable for epitaxy.

The use of amines and amine hydrochlorides as catalysts has been proposed (see, for example, U.S. Pat. No. 2,834,648 and French Pat. No. 2,096,605) but these catalysts give low yields. The use of hexamethylphosphotriamide as catalyst (see French Pat. No. 1,444,735) makes it possible to obtain dichlorosilane in good yields, but this compound cannot be used for silicon epitaxy because it contains impurities containing phosphorus. Finally, it has been proposed to use dimethylformamide or dimethylacetamide as the catalyst, but the yields of dichlorosilanes are low as a result of degradation of the catalyst.

It has now been found, according to the present invention, a process for the dismutation of trichlorosilane to dichlorosilane which is characterised in that an α-pyrrolidone which is N-substituted by a hydrocarbon radical is used as the catalyst.

The use of a N-substituted pyrrolidone as the catalyst makes it possible to obtain, by dismutation at temperatures as low as 50° C, excellent yields of dichlorosilane which is very suitable for silicon epitaxy and which, in particular generally contains less than 0.001 ppm of boron, phosphorus and arsenic.

Suitable N-substituted pyrrolidones correspond, in particular, to the general formula:

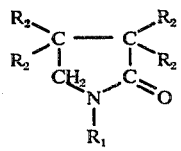

(I)

in which $R_1$ represents a straight or branched alkyl or alkenyl radical having at most 6 carbon atoms or a cyclohexyl or phenyl radical and each $R_2$ radical, which may be identical or different, represents a hydrogen atom or a methyl radical.

The N-substituted pyrrolidones of formula (I) can be obtained in accordance with the teachings of, for example, French Pat. No. 1,439,192 by reductive amination of an alkylated or non-alkylated succinic acid.

Amongst the N-substituted α-pyrrolidones there may be mentioned, in particular, N-methylpyrrolidone, N-ethylpyrrolidone, N-cyclohexylpyrrolidone, N-vinylpyrrolidone and 1,13- or 1,4-dimethyl-pyrrolidone. Obviously, N-methylpyrrolidone, the industrial use of which is well-known, is preferred.

The amount of catalyst employed is not critical but is generally from 1 to 50%, preferably 3 to 20%, by weight based on the weight of the trichlorosilane employed. All the catalyst can be added at the start of the reaction, or the catalyst can be added in stages.

The process can be carried out continuously or discontinuously, for example by heating all the reactants to the reflux temperature under atmospheric pressure with an initial temperature of the order of 30° to 40° C, with removal of the dichlorosilane, by distillation, at the rate at which it is formed. It is also possible to add a diluent to the reactants, such as an aliphatic or aromatic hydrocarbon, in particular cyclohexane or benzene. It is also possible, in order to increase the rate of the dismutation reaction, to carry out the process above atmospheric pressure, for example under a pressure which can be up to 3 bars absolute. The temperature of the dismutation reaction is in general from 30° to 120° C.

When the dismutation reaction is complete, it is found that, in general, some trichlorosilane remains in the reaction mixture and the presence of silicon tetrachloride generated by the reaction is observed. The trichlorosilane can be recovered by distillation and again be subjected to dismutation to give dichlorosilane.

The following Examples further illustrate the present invention; temperatures are in degrees Centigrade.

EXAMPLE 1

792 g of trichlorosilane and 79 g of N-methylpyrrolidone are introduced into a flask which is kept under a nitrogen atmosphere, the mixture is heated to the reflux temperature (T = 33°) and the dichlorosilane is distilled under atmospheric pressure at the rate at which it is formed. Over 6 hours, during which the temperature of the reaction mixture rises from 33° to 50° and the temperature of the distiallate remains at about 10°, 158 g are collected, containing essentially dichlorosilane and a little trichlorosilane and monochlorosilane. By rectification of the distillate; 140 g (boiling point 8.5° – 9°), corresponding to pure dichlorosilane, is isolated. Chromatographic analysis shows that 229.8 g of unreacted trichlorosilane remain and that 386 g of silicon tetrachloride have been formed.

This dichlorosilane is very suitable for epitaxy. Its contents of boron, phosphorus, arsenic and aluminium are less than 0.001 ppm (determined by colorimetry, atomic absorption and emission spectrography).

EXAMPLE 2

Several tests are carried out in accordance with the procedure of Example 1, varying the amount of N-methylpyrrolidone employed. The dichlorosilane is isolated and purified as in Example 1. The results and conditions are given in the Table:

| Experiment | Trichlorosilane | N-methylpyrrolidone | Duration | Temperature of the reaction mixture | Dichlorosilane |
|---|---|---|---|---|---|
| 1 | 474 g | 24 g | 7 hrs | 34° to 45° | 73.7 g |
| 2 | 474 g | 71 g | 7 hrs | 34.5° to 67° | 75 g |

| Experiment | Trichlorosilane | N-methylpyrrolidone | Duration | Temperature of the reaction mixture | Dichlorosilane |
|---|---|---|---|---|---|
| 3 | 493 g | 92 g | 7 hrs 10 mins | 34.5° to 77° | 62.5 g |

EXAMPLE 3

630 g of trichlorosilane and 64 g of N-methylpyrrolidone are introduced into a flask kept under a nitrogen atmosphere, the mixture is heated to the reflux temperature and the dichlorosilane is distilled at the rate at which it is formed. After 5 hours' reaction, 30 g of N-methylpyrrolidone are added and the reaction is continued for 4 hours 30 minutes. During the experiment, the temperature of the reaction mixture rises from 34.5° to 68.5° whilst the temperature of the distillate remains at about 11.3. 119 g are collected, from which 108 g of pure dichlorosilane are isolated by rectification. Chromatographic analysis was used to show that 85 g of unreacted trichlorosilane remain.

EXAMPLE 4

620 g of trichlorosilane and 124 g of N-vinylpyrrolidone are introduced into a flask kept under a nitrogen atmosphere, the reactants are heated to the reflux temperature (T : 33°) and the dichlorosilane is then distilled at the rate at which it is formed. After 16 hours 30 minutes, when the temperature of the reaction mixture has risen from 38° to 58°, 129 g of distillate have been collected, from which 99 g of pure dichlorosilane are isolated. Chromatographic analysis is used to show that 160 g of unreacted trichlorosilane remain.

We claim:

1. In a process for the preparation of dichlorosilane by treating trichlorosilane in the presence of a catalyst, the improvement wherein an α-pyrrolidone of the formula:

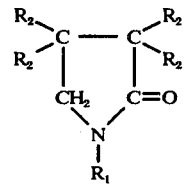

in which $R_1$ represents a straight or branched alkyl or alkenyl radical having at most 6 carbon atoms, a cyclohexyl radical or a phenyl radical and each $R_2$ radical, which may be identical or different, represents a hydrogen atom or a methyl radical is used as the catalyst in an amount of from 1 to 50% by weight based on the weight of the trichlorosilane and wherein the treating is carried out at a temperature of from 30° C to 120° C.

2. Process according to claim 1, in which the pyrrolidone is N-methylpyrrolidone.

3. Process according to claim 1, in which the dichlorosilane is isolated from the reaction mixture at the rate at which it is formed, by distillation.

4. Process according to claim 1, in which the catalyst is used in an amount from 3 to 20% by weight based on the weight of trichlorosilane.

5. Process according to claim 1, which is carried out at a pressure up to 3 bars absolute.

* * * * *